US012766883B2

(12) United States Patent
Spahr et al.

(10) Patent No.: US 12,766,883 B2
(45) Date of Patent: Oct. 20, 2026

(54) HUB AND ROTOR, IN PARTICULAR FOR BICYCLES

(71) Applicant: DT SWISS INC., Grand Junction, CO (US)

(72) Inventors: Stefan Spahr, Lengnau (CH); Nicholas Omlin, Rapperswil (CH)

(73) Assignee: DT SWISS INC., Grand Junction, CO (US)

( * ) Notice: Subject to any disclaimer, the term of this patent is extended or adjusted under 35 U.S.C. 154(b) by 412 days.

(21) Appl. No.: 18/503,366

(22) Filed: Nov. 7, 2023

(65) Prior Publication Data

US 2024/0149614 A1 May 9, 2024

(30) Foreign Application Priority Data

Nov. 8, 2022 (DE) ..................... 10 2022 129 472.2

(51) Int. Cl.

| | |
|---|---|
| ***B60B 27/04*** | (2006.01) |
| ***B60B 27/00*** | (2006.01) |
| ***B60B 27/02*** | (2006.01) |
| ***F16D 41/24*** | (2006.01) |

(52) U.S. Cl.

CPC .......... *B60B 27/047* (2013.01); *B60B 27/001* (2013.01); *B60B 27/023* (2013.01); *F16D 41/24* (2013.01)

(58) Field of Classification Search

CPC ... B60B 27/047; B60B 27/023; B60B 27/001; B60B 27/0031; F16D 41/24

See application file for complete search history.

(56) References Cited

U.S. PATENT DOCUMENTS

| | | | |
|---|---|---|---|
| 6,588,564 | B1 | 7/2003 | Jaeger et al. |
| 8,936,144 | B2 | 1/2015 | Spahr et al. |
| 10,442,245 | B2 | 10/2019 | Walthert |
| 11,220,133 | B2 | 1/2022 | Walthert et al. |

(Continued)

FOREIGN PATENT DOCUMENTS

| | | | | |
|---|---|---|---|---|
| DE | 102004004961 A1 * | 8/2005 | | ............. F16D 41/36 |
| DE | 102007026821 A1 | 12/2008 | | |

(Continued)

OTHER PUBLICATIONS

German Search Report received for Application No. 10 2022 129 568.0 dated Aug. 17, 2023.

*Primary Examiner* — Kip T Kotter
(74) *Attorney, Agent, or Firm* — Greer, Burns & Crain, Ltd

(57) ABSTRACT

A bicycle hub with a rotor, including a rotor body, extending from an inner end toward an outer end, wherein the rotor body is rotatably supported on the hub axle with a hub-side rotor bearing and an opposite, outer rotor bearing. The rotor includes a rotor-side toothed disk device coupled with the rotor body, to fixedly, drivingly couple the rotor body with a hub shell, and to decouple from a hub shell when free-wheeling. The rotor-side toothed disk device includes an end toothing engaging an end toothing coupled with the hub shell. The rotor-side toothed disk device is biased to an engagement position. The rotor body includes a first rotor part and a second rotor part connected with the first rotor part in a drivingly, rotationally fixed manner. One rotor bearing is on one of the rotor parts and the other rotor bearing is on the other rotor part.

18 Claims, 5 Drawing Sheets

(56) References Cited

U.S. PATENT DOCUMENTS

| | | | |
|---|---|---|---|
| 11,400,754 B2 | 8/2022 | Spahr et al. | |
| 2002/0067068 A1* | 6/2002 | Kanehisa | B62K 25/02 301/110.5 |
| 2012/0285785 A1* | 11/2012 | Tho | F16D 27/01 192/64 |
| 2013/0088075 A1* | 4/2013 | Spahr | B60B 27/0031 301/110.5 |
| 2014/0238808 A1* | 8/2014 | Lai | B60B 27/023 192/46 |

FOREIGN PATENT DOCUMENTS

| | | | |
|---|---|---|---|
| DE | 102007063895 | B3 | 12/2016 |
| DE | 102015009041 | A1 | 1/2017 |
| DE | 102016115515 | A1 | 2/2018 |
| DE | 102018101725 | A1 | 7/2019 |
| DE | 102020103129 | A1 | 8/2021 |
| EP | 2221192 | A1 | 8/2010 |

* cited by examiner

HUB AND ROTOR, IN PARTICULAR FOR BICYCLES

BACKGROUND

The present invention relates to a hub and a rotor for a hub for at least partially muscle-powered vehicles and, in particular, bicycles, in normal and regular proper use, wherein the hub comprises a hub shell and a rotor with a rotor body.

The hub shell and the rotor are supported for rotation with at least two roller bearings each. In the rotor and the hub shell, a freewheel device is provided to connect the rotor with the hub shell, non-rotatable in the driving direction. While the user is not applying any driving force or while back-pedalling, the freewheel device enables a freewheeling state, in which the hub can continue rotating, while the rotor remains for example motionless.

Other than in bicycles, the hub may be used in other partially muscle-powered vehicles and two-wheeled vehicles, which are for example provided with an electric auxiliary drive. The hub is, in particular, used in sports bicycles. In all the configurations, the hub and the rotor are employed in vehicles and, in particular, bicycles, which in normal and regular proper use are at least partially muscle-powered.

EP 1 121 255 B1 has disclosed a hub with a toothed disk freewheel which reliably and very quickly transmits the driving force from the rotor to the hub shell. Friction loss is relatively low while the user is not actuating the pedals. The hub provides for reliable function, enabling applying even loads on the teeth of the toothed disks. To this end, this hub employs two toothed disks, each of which is axially movable, and which are axially urged toward one another from the outside, by way of a spring each. The two toothed disks are thus floatingly supported and for example in case of the hub flexing or other types of stresses, they may be oriented to one another to provide a particularly reliable operation. In the known hub, the toothed disks are axially disposed between the roller bearings for supporting the hub shell, and the roller bearings for supporting the rotor. The known hub works reliably. Suitable examples of other conventional hubs are disclosed in commonly-owned U.S. Pat. Nos. 6,588,564 and 11,220,133, the contents of which are incorporated by reference herein. A still higher stability is desirable.

It is therefore the object of the present invention to provide a hub and a rotor for a hub, which enables a still higher structural stability.

SUMMARY

A hub according to the invention is provided for at least partially muscle-powered vehicles and, in particular, bicycles, and comprises a hub axle which is, in particular, hollow, a hub shell, a rotor, and a freewheel device. The hub shell is supported for rotation relative to and, in particular, on the hub axle with at least two axially spaced apart hub bearings, namely with a rotor-side hub bearing and an opposite, outer hub bearing, which is disposed further distant from the rotor. The rotor comprises a rotor body and is supported for rotation by way of at least two axially spaced apart rotor bearings relative to and, in particular, on the hub axle. The rotor comprises a hub-side rotor bearing and an opposite, outer rotor bearing, which is disposed further distant from the hub shell. The freewheel device comprises a hub-side toothed disk device and a rotor-side toothed disk device interacting therewith, each comprising an end toothing for engagement with one another, and being biased to an engagement position by means of at least one biasing device. The rotor body comprises at least two rotor parts, namely a first rotor part and a second rotor part which is connected with the first rotor part in a rotationally fixed manner at least in the driving direction. One of the rotor parts accommodates one of the rotor bearings, and the other of the rotor parts accommodates the other of the rotor bearings. The rotor-side toothed disk device is accommodated on the rotor body. The rotor-side toothed disk device forms a separate part, which is accommodated on, and, in particular, in the rotor body.

The hub according to the invention has many advantages. A considerable advantage of the hub according to the invention consists in that the structure of the rotor with two rotor parts enables a flexible configuration. Thus, structures are enabled which, in the case of a one-piece structure, may require a very exact calculation of the wall thicknesses and/or more precise manufacturing tools. A two-piece rotor provides for a simple option of a flexible configuration of the structure.

Preferably, the first rotor part accommodates the outwardly rotor bearing, and the second rotor part, in particular, accommodates the hub-side rotor bearing.

Preferably, the rotor-side toothed disk device is radially accommodated between the first rotor part and the second rotor part and coupled with the first rotor part in a rotationally fixed manner. Such a configuration is very advantageous and enables an “encapsulated” structure and accommodation of the rotor-side toothed disk device on the rotor.

In particularly preferred configurations, the rotor-side toothed disk device is accommodated axially movable and is biased to the engagement position by way of a biasing device assigned to the rotor-side toothed disk device.

The hub-side toothed disk device is, in particular, accommodated axially movable on the hub shell and is biased to the engagement position by way of a biasing device assigned to the hub-side toothed disk device.

It is particularly advantageous for both of the toothed disk devices to comprise their own biasing device each, or to be urged or pulled toward one another by one shared biasing device, since then, a floating support of both of the toothed disk devices allows one of the toothed disk devices to compensate for any malfunction of the other of the toothed disk devices. This enhances the reliability and functionality of the hub.

In advantageous specific embodiments, the hub-side toothed disk device and the rotor-side toothed disk device each comprise an outer radial toothing and engage in inner radial toothings in the hub shell and the rotor, in which they are each accommodated in a rotationally fixed manner in the driving direction. It is conceivable for each of the radial toothings to be configured as helical toothings, so that in the case of axial movement of the toothed disk devices, the toothed disk devices perform a certain rotary motion.

Particularly preferably, the second rotor part is screw-connected with the first rotor part, and, in particular, the second rotor part is accommodated in, and particularly preferably screwed into, the first rotor part.

In particular, is an inner radial wall configured on the second rotor part at the hub-side end to radially support a hub-side rotor bearing. This enables a particularly wide support for the rotor.

Preferably, on the end face at the hub-side end of the rotor, radially between the inner radial wall and an outer wall of the rotor, a circumferential accommodation accessible from the end face is configured in which the rotor-side toothed disk device is accommodated in a rotationally fixed manner in the driving direction and axially movable. Preferably, the inner radial wall is provided by the second rotor part. The outer wall of the rotor with the inner radial toothing configured therein is provided by the first rotor part, so that the accommodation for the toothed disk device is configured between the first rotor part and the second rotor part. The accommodation comprises the axial guiding of the rotor-side toothed disk device.

In preferred configurations, a connecting area of the first rotor part is connected with a connecting portion of the second rotor part. Preferably, the connecting portion comprises a threaded portion and a guiding portion, and the connecting area comprises a threaded area and a guiding area. The threaded area is, in particular, screw-connected with the threaded portion, and the guiding area is centered on the guiding portion. What is particularly preferred is, a radial tolerance between the first rotor part and the second rotor part, which is greater on the threaded portion than on the guiding portion. Thus, a considerably improved centering of the rotor body is achieved, since centering is not achieved by way of the connection thread but by way of the considerably narrower tolerance between the guiding area and the guiding portion.

In preferred specific embodiments, the length of the connecting portion of the second rotor part corresponds to at least a quarter or a third, and/or half the length of the second rotor part.

Preferably, the ratio of the length of the guiding portion to the length of the connecting portion is at least 1 to 4, and it may be higher. Preferably, the ratio of the length of the guiding portion to the diameter of the guiding portion is higher than 1 to 10. This ensures the required precise guidance.

The rotor according to the invention is provided for a hub for at least partially muscle-powered vehicles and, in particular, for bicycles. The rotor comprises a rotor body, which extends from an inner, hub-side end toward an outer end. The rotor body is supported for rotation by way of two axially spaced apart rotor bearings relative to and, in particular, on the hub axle, namely with a hub-side rotor bearing and an opposite, outer rotor bearing.

Furthermore, the rotor comprises a rotor-side toothed disk device coupled with the rotor body, to couple the rotor body with a hub shell in a rotationally fixed manner in the driving direction, and to decouple from a hub shell in a freewheeling position. The rotor-side toothed disk device is configured as a separate part and is accommodated on the rotor body. The rotor-side toothed disk device comprises an end toothing for engagement in an end toothing coupled to the hub shell. The rotor-side toothed disk device is biased to an engagement position by means of at least one biasing device. The rotor-side toothed disk device is accommodated on the rotor body for movement in the axial direction. The rotor body comprises at least two rotor parts, namely a first rotor part and a second rotor part which is connected with the first rotor part in a rotationally fixed manner in the driving direction. One of the rotor parts accommodates one of the rotor bearings, and the other of the rotor parts accommodates the other of the rotor bearings.

The rotor according to the invention has many advantages. The rotor according to the invention enables a simple and flexible construction of a rotor body having flexible structural properties.

Preferably, the first rotor part accommodates the outer rotor bearing (in the mounted condition, further distant from the hub shell), and the second rotor part accommodates the hub-side rotor bearing. In particular, the rotor-side toothed disk device is radially accommodated between the first rotor part and the second rotor part, and coupled with the first rotor part in a rotationally fixed manner. In particular, the rotor-side toothed disk device is accommodated axially movably and biased to the engagement position by way of a biasing device.

In all the configurations it is preferred for the rotor-side toothed disk device to have an outer radial toothing, and to engage in an inner radial toothing in the rotor, and to be accommodated in a rotationally fixed manner in the driving direction.

In particular, is the second rotor part accommodated in the first rotor part, and preferably, the second rotor part is screw-connected with the first rotor part, and particularly preferably, the second rotor part is screwed into the first rotor part.

Preferably, an inner radial wall is configured on the second rotor part at the hub-side end to radially support the hub-side rotor bearing. In particular, a circumferential accommodation accessible from the end face is configured at the end face on the hub-side end of the rotor, radially between the inner radial wall and an outer wall of the rotor, in which the rotor-side toothed disk device is accommodated in a rotationally fixed manner in the driving direction and axially movable.

In all the configurations it is preferred for the first rotor part to have a connecting area which is connected with a connecting portion of the second rotor part. The connecting portion, in particular, comprises on the second rotor part a threaded portion and a guiding portion. Preferably, the connecting area on the first rotor part comprises a threaded area and a guiding area.

Particularly preferably, the threaded area of the first rotor part is screw-connected with the threaded portion of the second rotor part, and the guiding area of the first rotor part is guided on the guiding portion of the second rotor part where it is centered.

The radial tolerance between the first rotor part and the second rotor part on the threaded portion is higher than on the guiding portion, or vice versa, the radial tolerance on the guiding portion is preferably considerably lower than on the threaded portion. This allows precise centering of the rotor, which must carry out a highly precise rotational motion in operation.

Preferably, the length of the connecting portion of the second rotor part is at least a quarter or a third, or even half the length of the second rotor part. In particular, the ratio of the length of the guiding portion to the diameter of the guiding portion is at least 1 to 10, and it may be higher still. Particularly preferably, the ratio of the length of the guiding portion to the length of the connecting portion is at least 1 to 4, and it may be higher still. This enables a high quality guiding and centering of the rotor.

In all the configurations it is preferred for the second rotor part to be at least ¼ or ⅓ or half the length of the first rotor part and/or of the entire rotor body.

Further advantages and features of the present invention can be taken from the exemplary embodiments which will be discussed below with reference to the enclosed figures.

DETAILED DESCRIPTION

Figure 1:
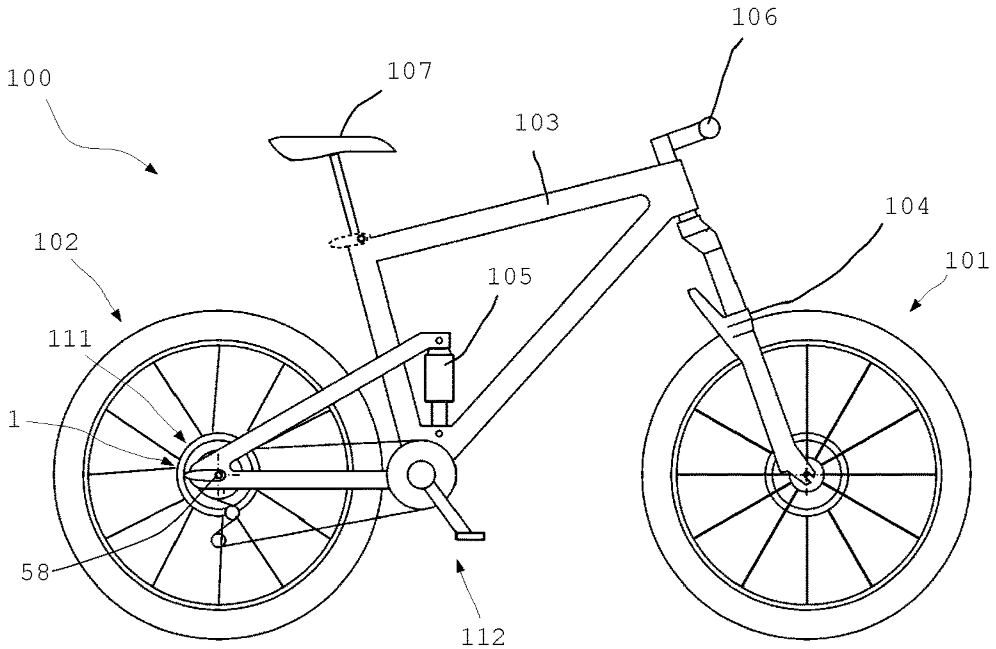
FIG. 1 a schematic illustration of a mountain bike.
Figure 2:
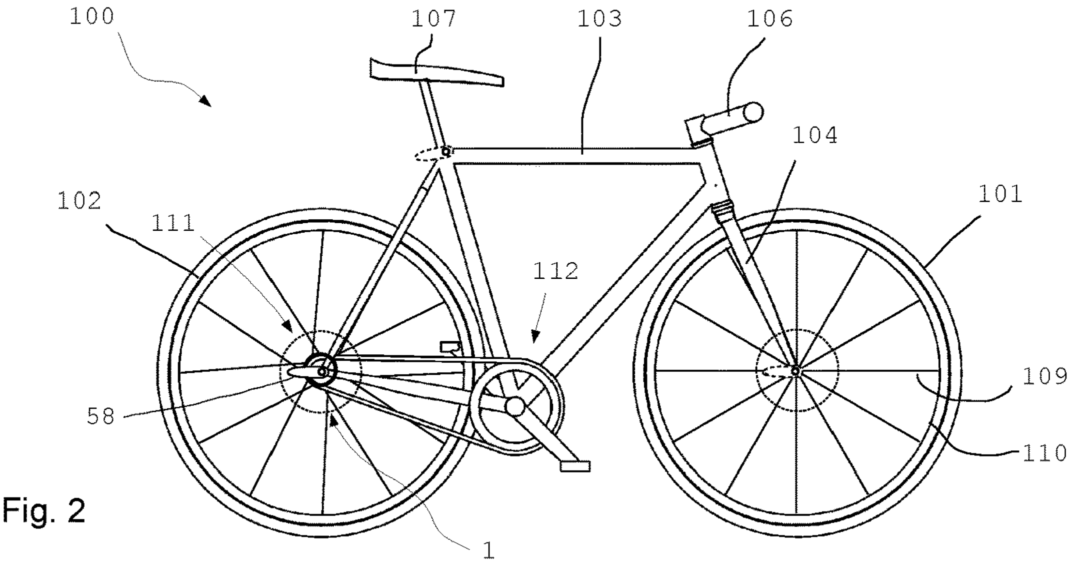
FIG. 2 a schematic illustration of a racing bicycle.

The FIGS. 1 and 2 illustrate a mountain bike respectively a racing bicycle 100 which are each equipped with a hub 1 according to the invention. The mountain bike or racing bicycle 100 is provided with a front wheel 101 and a rear wheel 102. The hub 1 according to the invention is used with the rear wheel 102. The two wheels 101, 102 comprise spokes 109 and a rim 110 and a sprocket assembly 111. Basically, conventional caliper brakes or other brakes such as for example disk brakes may be provided.

A bicycle 100 comprises a frame 103, a handlebar 106, a saddle 107, a fork or suspension fork 104 and in the case of the mountain bike, a rear wheel damper 105 may be provided. A pedal crank 112 with pedals serves for driving. Optionally the pedal crank 112 and/or the wheels may be provided with an electrical auxiliary drive. The hub 1 of the wheels may be attached to the frame by means of a clamping mechanism 58 (for example a through axle or quick release).

Figure 3:
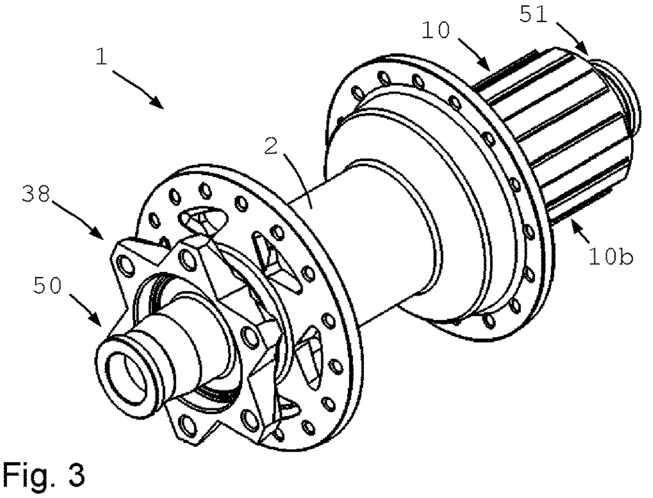
FIG. 3 a perspective illustration of a hub according to the application.
Figure 4:
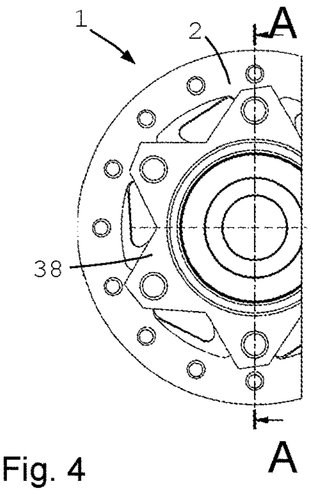
FIG. 4 a front view of the hub according to FIG. 3.

The hubs 1 inserted in the rear wheels 102 in the bicycles according to FIGS. 1 and 2 are shown in FIG. 3 in perspective, and in FIG. 4 in a front view.

The hub 1 comprises a hub shell 2 and a rotor 10, and a brake disk accommodation 38. The outer surface of the rotor 10 is provided with a sprocket accommodation 10*b* to accommodate a sprocket cluster having an appropriate quantity of sprockets. The two ends of the hub 1 are provided with limit stops 50, 51, presently shown pushed on, but they may optionally be pushed in or screw-fastened. As can be seen, the limit stops 50, 51 are configured hollow and serve to accommodate a clamping axle 59 with which to fasten the hub 1 to the frame.

Figure 5:
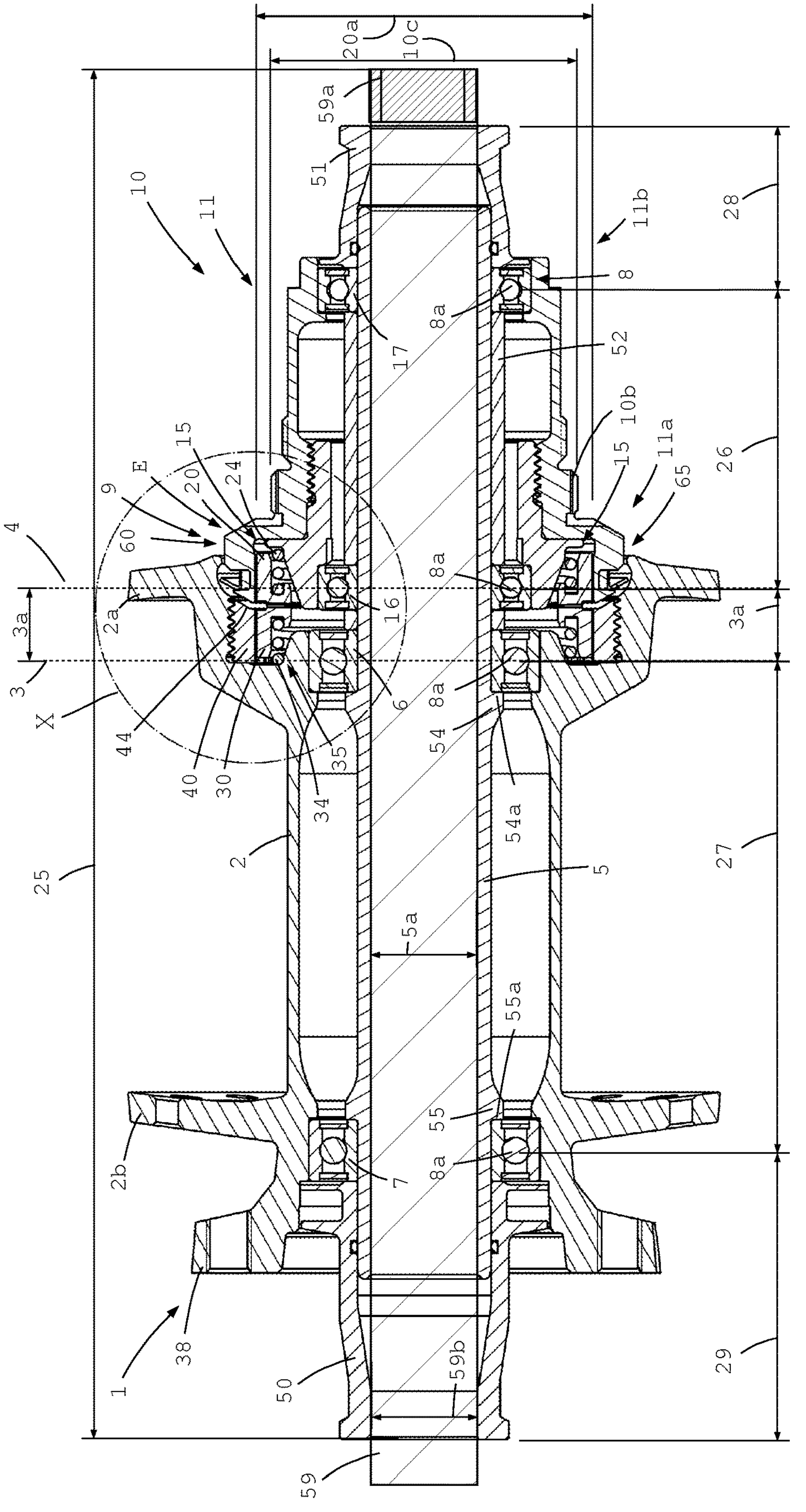
FIG. 5 a cross section A-A through the hub according to FIG. 4.

FIG. 5 shows the cross section A-A of FIG. 4. The hub 1 presently has a fitted length 25 of 148 mm. The hub 1 comprises the hollow hub axle 5, on which the hub shell 2 is supported for rotation by way of the hub bearings 6 and 7. The rotor 10 is presently supported for rotation immediately on the hub axle 5, likewise by way of the roller bearings 16 and 17.

On the hub axle 5, closer to the rotor 10, a bulge 54 with a radial shoulder 54*a* is configured, and at the outer end beneath the hub flange 2*b*, a bulge 55 with a radial shoulder 55*a* is configured. The rotor-side hub bearing 6 rests against the radial shoulder 54*a*, and the outer hub bearing 7 disposed at the other end of the hub shell 2 rests against the shoulder 55*a* of the hub axle 5. Axially outwardly, the limit stop 50 follows the outer hub bearing 7, which is presently pushed onto the hub axle 5, and seals the hub shell to the outside by means of a double flange protruding outwardly.

Toward the rotor 10, the rotor-side hub bearing 6 is followed by a (thin, and presently disk-shaped) spacer 53 and thereafter, by the hub-side rotor bearing 16. Between the hub-side rotor bearing 16 and the outer rotor bearing 17, a sleeve 52 acting as a spacer is pushed onto the hub axle 5. Axially outwardly, the limit stop 51 follows the outer rotor bearing 17. The hub 1 is fixedly clamped into the frame.

The hollow hub axle 5 shows an inner clear diameter 5*a* which, depending on the configuration, may be 12 mm, 15 mm, or 16 mm or 17 mm or more. A clamping axle 59 of a clamping mechanism 58 can be pushed through the hollow hub axle 5 for attaching the hub 1 to the frame of a bicycle. At one of its ends, the clamping axle 59 may comprise for example an end piece 59*a* with an external thread, with which to screw the clamping axle 59 into a suitable thread on the frame. At the other of its ends, a corresponding clamping mechanism may be provided, to reliably accommodate and clamp the hub 1 to a frame.

The outer diameter 59*b* of the clamping axle 59 and the inner diameter 5*a* of the hollow hub axle 5 are matched to one another such that on the one hand, a (relatively) unimpeded passage of the clamping axle through the hollow hub axle 5 is enabled, while on the other hand, the hollow hub axle 5 can also be supported on the clamping axle 59 in operation, if the loads applied result in local deflection. In this way, the stability of the hub 1 on the whole is increased.

Alternately it is also possible to omit this additional support. Then, a clamping axle 59 is employed, showing a noticeable radial distance between the hub axle 5 and the clamping axle 59 over large parts of the hub axle 5, to not at all, or to a very minor extent, affect the insertion or removal of the clamping axle.

According to the application, the hub bearings 6 and 7 and also the rotor bearings 16 and 17 are each configured as roller bearings 8, each comprising a plurality of rolling members 8. In this exemplary embodiment, all the roller bearings are configured as deep-groove ball bearings.

The hub 1 is fixedly clamped into the frame in the axial direction. Then, the force flow runs for example from what is the left end in FIG. 5, through the limit stop 50, the inner bearing ring of the outer hub bearing 7, and over the shoulder 55*a* of the bulge 55 into the hollow hub axle 5. From there, the introduced force is guided over the shoulder 54*a* of the bulge 54 into the inner bearing ring of the hub bearing 6 and through the spacer 53 between the rotor-side hub bearing and the hub-side rotor bearing 16. From there, the force enters into the inner bearing ring of the hub-side rotor bearing 16 and is guided over the sleeve 52 to the inner bearing ring of the outer rotor bearing 17 and from there through the limit stop 51, back into the frame. The hub shell 2 and the rotor 10 are radially and axially retained by way of the deep-groove ball bearings.

On the rotor side, the hub shell 2 has a hub flange 2*a*, and on the other side, a hub flange 2*b*. The spokes can be attached to the hub flanges 2*a*, 2*b*. Opposite the rotor 10, the other, outer hub end is provided with the brake disk accommodation 38.

Radially within the rotor-side hub flange 2*a*, a threaded ring 40 is screwed into the hub shell, comprising an inner radial toothing 43 in which the hub-side toothed disk device 30 is inserted. On the hub-side end of the rotor 10, radially within the end portion 60, the rotor-side toothed disk device 20 of the freewheel device 9 is inserted. The end portion 60 extends from the hub-side end 60*a* on the hub-side end face 10*a* axially outwardly, through to the other, outer end 60*b*.

Both the rotor-side toothed disk device 20 and the hub-side toothed disk device 30 comprise an outer radial toothing 23, 33 each, meshing with corresponding inner radial toothings 43 in the threaded ring 40 and in the interior of the end portion 60. Thus, the rotor-side toothed disk device 20 and the hub-side toothed disk device 30 are non-rotatably coupled with the rotor 10 respectively the hub shell 2.

Figure 11A:
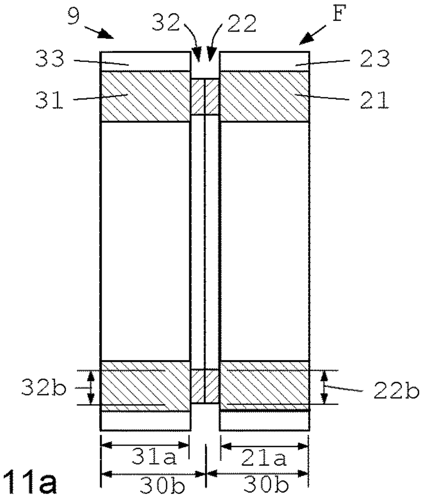
FIGS. 11*a, b* schematic views of a freewheel device and the toothed disk device for a hub according to the application.

At the same time, both of the toothed disk devices 20, 30 can each be moved in the axial direction between an engagement position E (FIG. 5) and a freewheel position F(FIG. 11*a*). Due to the end toothing respectively helical toothing, the oblique tooth faces of the end toothing slip off each other during backpedaling, urging the toothed disk devices 20, 30 apart in the axial direction. When driving force is applied, the end toothings re-engage with one another.

The toothed disk device 20 is biased by way of the biasing device 24, presently in the shape of a cylindrical coil spring, in the engagement position E illustrated. Correspondingly, the toothed disk device 30 is axially biased in the engagement position E, by way of a biasing device or pre-tensioning device 34, which is presently again configured as a cylindrical coil spring. Presently, this means that the hub-side toothed disk device 30 is biased in the direction toward the rotor, while the rotor-side toothed disk device 20 is biased in the direction toward the hub shell 2, by means of the biasing device or pre-tensioning device 24. The action of the biasing device can be effected by means of mechanical springs, or magnetic springs, or pneumatically.

The rotor 10 comprises a rotor body 11, extending from the hub-side end 11*a* to the opposite, outer end 11*b*. On the outer surface of the rotor body 11 the sprocket accommodation 10*b* is provided. This is where a sprocket or several sprockets, or a sprocket cluster can be attached.

On the hub-side end 11*a*, the end portion 60 having an enlarged diameter is configured. Inside of the end portion 60 the rotor-side toothed disk device 20 is accommodated, which comprises an outer diameter 20*a* which is larger than the outer diameter 10*c* of the sprocket accommodation 10*b* of the rotor body 11. The outer diameter 30*a* corresponds to the outer diameter 20*a*. The axial widths 20*b* and 30*b* are likewise identical.

As can be clearly seen in FIG. 5, the planes of rolling member respectively planes of cross section 3, 4 extending transversely to an axis defined by the axle each also intersect the toothed disk devices 20, 30 (through the rolling members 8*a* of the rotor-side hub bearing 6 and the hub-side rotor bearing 16). It can be seen that the plane of rolling member respectively plane of cross section 4 runs through the hub-side rotor bearing 16, the biasing device 24, and the radial toothing of the rotor-side toothed disk device 20, and through the hub flange 2*a* of the hub shell. Furthermore, a sealing unit 68 disposed radially outwardly on the end portion 60 is intersected by the plane of cross section respectively plane of rolling member 4.

Such a configuration, in which the planes of cross section respectively planes of rolling member 3 and 4 intersect the engaging portions of the radial toothings of the two toothed disk devices and each of the assigned roller bearings 6, 16, offers an optimal transfer of the loads occurring in operation. The distance 26 of the two rotor bearings 16, 17 may be selected very large, since the rotor-side toothed disk device 20 is disposed radially outwardly of the hub-side rotor bearing 16, surrounding it radially. The distance 27 of the two hub bearings 6, 7 may likewise be selected very large, since the hub-side toothed disk device 30 is also disposed radially outwardly of the rotor-side hub bearing 6, surrounding it radially.

The clear inner diameters 20*c*, 30*c* of the two toothed disk devices are (considerably) larger than the outer diameters of the pertaining roller bearings 6, 16. The clear inner diameters 20*c*, 30*c* (see FIG. 6) are considerably larger, since on the outer diameters 6*b*, 16*b*, the roller bearings 6, 16 each support an inner wall 18, 36 of the rotor 10 respectively the hub shell 2, which extend toward one another finger-like beneath the accommodations 15, 35.

The accommodation 15, in which the rotor-side toothed disk device 20 is non-rotatably received, is configured radially outside of the inner wall 18 at the rotor. The accommodation 35, in which the hub-side toothed disk device 30 is non-rotatably received on the threaded ring 40, is configured radially outside of the inner wall 36 in the hub shell.

When the mounting width 25 is for example 148 mm, this structural design allows a distance 27 of the two hub bearings between 55 mm and 60 mm, and presently specifically for example 57 mm. The distance 3*a* of the two planes of cross section 3, 4 may be very narrow, and may presently be for example 7 mm, 8 mm or 9 mm. The distance 26 of the two rotor bearings 16, 17 may be between 27 mm and 35 mm, and presently it is for example 32 mm. The distance 28 may be 18 mm, and the distance 29 may be 33 mm.

Figure 6:
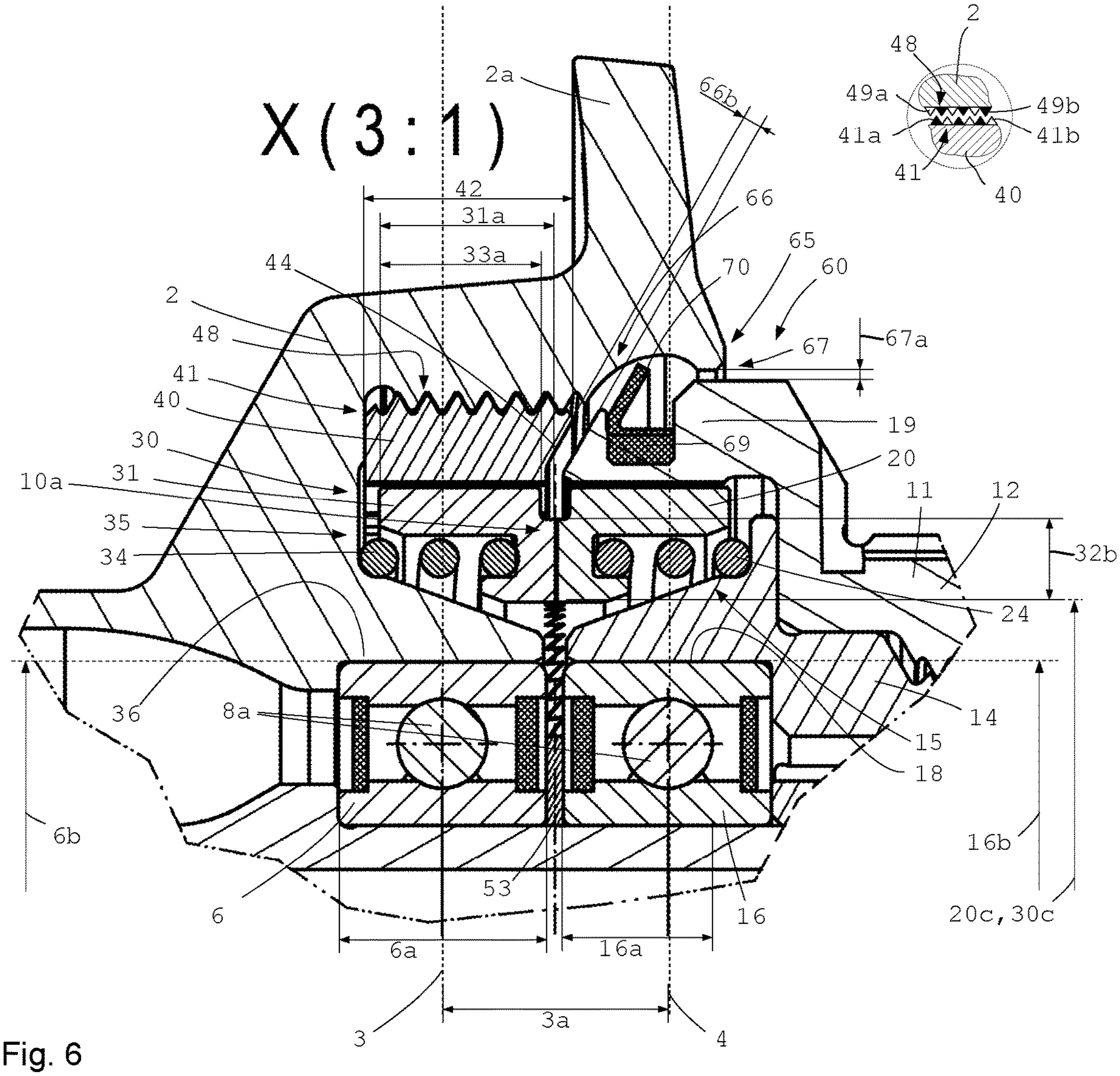
FIG. 6 an enlarged detail "X" from FIG. 5.

FIG. 6 shows the enlarged detail X from FIG. 5. On the hub axle 5 one can recognize the rotor-side hub bearing 6 having a width 6*a* and its hub-side rotor bearing 16 having a width 16*a*, between which a thin spacer 53 can be seen. The spacer 53 decouples from one another the two outer bearing rings of the bearings 6, 16. The width of the spacer 53 is narrower than half or a quarter or an eighth of the axial width 16*a* of the hub-side rotor bearing 16.

The rotor-side hub bearing 6 supports a wall 36 of the hub shell 2, which extends finger-like and, in particular, wedge-like or tapered toward the rotor 10, surrounding the rotor-side hub bearing 6 radially outwardly. The hub shell 2 is supported by the wall 36. The accommodation 35 is configured radially around, accommodating the hub-side toothed disk device 30. The hub-side toothed disk device 30 is biased by the biasing device 34 in the engagement position E.

The toothed disk device 30 comprises an outer radial toothing 33 (see FIG. 11*b*), which meshes with an inner radial toothing 43 (see FIG. 12*a*) in the threaded ring 40. The threaded ring 40 is screwed into the internal thread 48 in the hub shell 2 by way of the external thread 41.

On the hub-side end face 10 of the rotor 10, an accommodation 15 is configured in which the rotor-side toothed disk device 20 is accommodated. The rotor-side toothed disk device 20 comprises an end toothing 22 oriented to the hub shell. The end toothing 22 meshes with the end toothing 32 on the hub-side toothed disk device 30. The toothed disk devices 20, 30 are each axially urged to one another by means of the biasing devices 24, 34.

Identical toothed disk devices 20, 30 are used, so as to facilitate installation, since confusion can be excluded. In terms of manufacturing technique, the accommodation 15 must be configured enlarged, to allow manufacture of the inner radial toothing 13 in the end portion 60 of the rotor 10. The conditions in the accommodations 15, 35 are identical.

The axial width 33*a* of the radial toothing 33 of the hub-side toothed disk device 30 and the (preferably) identical axial width 23*a* of the radial toothing 23 of the rotor-side toothed disk device 20, may, in particular, be larger than the axial width 16*a* or the axial width 6*a* of the roller bearing 6 respectively 16.

Figure 12A:
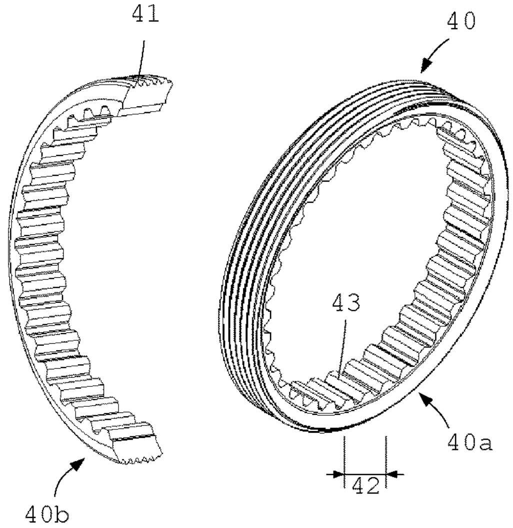
FIGS. 12*a-c* a schematic perspective view and schematic cross sections of a threaded ring for a hub according to the application.
Figure 12B:
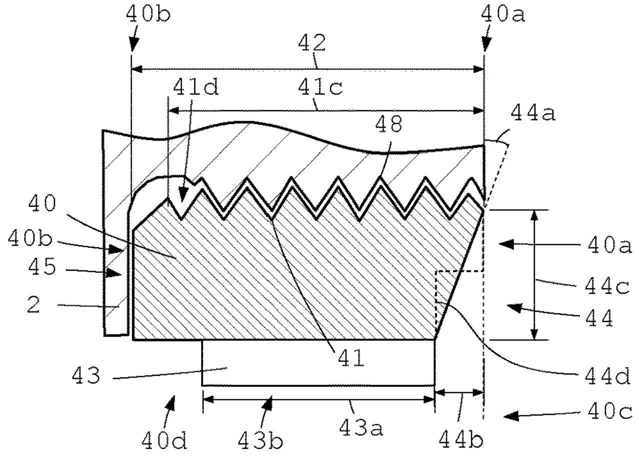

The axial width 42 of the threaded ring 40 is larger on the radial outside, since on the rotor side, the threaded ring has a central depression 44, which is presently configured as a conical depression respectively chamfer 44 (see FIG. 12*b*). This enlarges the thread length of the external thread 41, thus increasing the stability.

The engagement body 21, 31 of the rotor-side toothed disk device 20 and the hub-side toothed disk device 30 each comprise a radial toothing 23, 33 over an axial length 23*a* respectively 33*a*, which is clearly larger than the radial height 22*b* respectively 32*b* of the end toothing 22 respectively 32. This provides a precise guide for the two toothed disk devices in the axial direction. The axial length 21*a*, 31*a* of the engagement bodies 21, 31 is larger by the axial width of the end toothings.

The threaded ring 40 may be screw-connected with the hub shell 2 by means of a multiple thread. FIG. 6 shows on the top right an optional configuration, wherein two continuous and separate thread grooves 41*a* and 41*b* are screw-connected with corresponding thread grooves 49*a* and 49*b* in the hub shell 2.

The sealing device 65 for sealing the freewheel device 9 against environmental influences comprises a nearly horizontally configured (outer) narrow sealing gap 67 having a low radial height respectively clear dimension 67*a* of less than 0.5 mm. The outer sealing gap 67 extends between an enlarged diameter area 63 at the end portion 60 and a radially inwardly protruding wall 46 at the hub shell 2.

From there axially inwardly, a groove 62 is configured radially outside on the end portion 60, which accommodates a sealing unit 68 with a ring portion 69. An elastic sealing lip extends from the ring portion 69 obliquely outwardly out of the groove 62, so that a V-shaped cross section results between the ring portion 69 and the elastic sealing lip 70, which is opened axially outwardly toward the outer sealing gap 67. The sealing lip 70 protrudes into a peripheral groove 47 (see FIG. 8).

Axially further inwardly, a conical gap 66*a* respectively cone gap follows, having a clear gap width 66*b*. Overall, the sealing device 65 therefore comprises three sealing gaps, firstly the cone gap 66*a*, then the gap between the elastic sealing lip 70 and the wall of the sealing groove 47 in the hub shell, and the outer sealing gap 67 between the outer wall 19 in the enlarged diameter area 63 on the end portion 60 of the rotor 10.

FIG. 6 once again clearly shows that the plane of cross section 4 extends through the rolling members 8*a* of the hub-side rotor bearing 16, through the radial toothing 23, and through the sealing unit 68, and the rotor-side hub flange 2*a*. The hub-side rotor bearing 16 supports the inner radial wall 18 of the rotor body 11. On the radial outside thereof, the accommodation 15 is disposed in which the rotor-side toothed disk device 20 is non-rotatably accommodated, coupled with the rotor 10.

The simple structure reliably prevents errors in installation.

Figure 7:
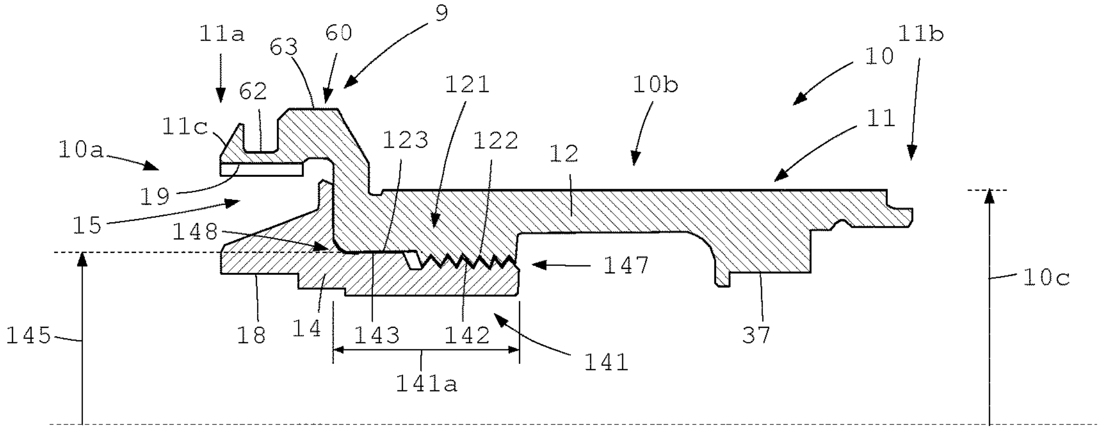
FIG. 7 a schematic, cross sectional view of the rotor of the hub according to FIG. 5.

FIG. 7 shows a schematic cross section through the rotor body 11 of the rotor 10, which extends from the hub-side end 11*a* toward the outer end 11*b*.

The rotor 10 consists of two rotor parts 12 and 14. The rotor body 11 comprises a first rotor part 12, which provides the sprocket accommodation 10*b*. Furthermore the wall 37 is configured on the first rotor part 12, by means of which wall the rotor 10 is supported on the hub axle 5 by way of the outer rotor bearing 17. The inner radial wall 18 is configured on the second rotor part 14, by means of which wall the rotor 10 is supported on the hub-side rotor bearing 16 for rotation around the hub axle 5.

The second rotor part 14 is screw-connected with the first rotor part 12. To provide aligned guiding and concentric running, which is, in particular, important for the rotor, the first rotor part 12 and the second rotor part 14 each comprise a connecting area 121 and a connecting portion 141. The connecting area 121 comprises a threaded area 122 and a guiding area 123. The connecting portion 141 comprises a threaded portion 142 and a guiding portion 143.

In the installed condition, the threaded area 122 and the threaded portion 142 are screw-connected. The required centering is effected by the guiding area 123 and the guiding portion 143. The radial tolerance 148 in the guiding portion 143 is less than the radial tolerance 147 between the threaded area 122 and the threaded portion 142.

On the outer surface of the rotor body 11, the sprocket accommodation 10*b* is provided, showing an outer diameter 10*c* which is smaller than the diameter of the inner radial toothings 13 on the accommodation 15 for the rotor-side toothed disk device 20.

The enlarged diameter area 63, which provides a wall of the sealing gap 67, is located on the end portion 60. The sealing unit 68 can be disposed in the peripheral groove 62. The conical portion 11*c* is configured at the hub-side end 11*a* on the first rotor part 12, forming, together with the conical depression 44 on the threaded ring 40, the inner sealing gap 66 respectively cone gap 66*a*. On the radial inside, the inner radial wall 18 can be seen, against which the rotor 10 is supported on the hub-side rotor bearing 16.

Radially between the first rotor part 12 and the second rotor part 14, the accommodation 15 is configured, in which the rotor-side toothed disk device 20 is accommodated.

Figure 8:
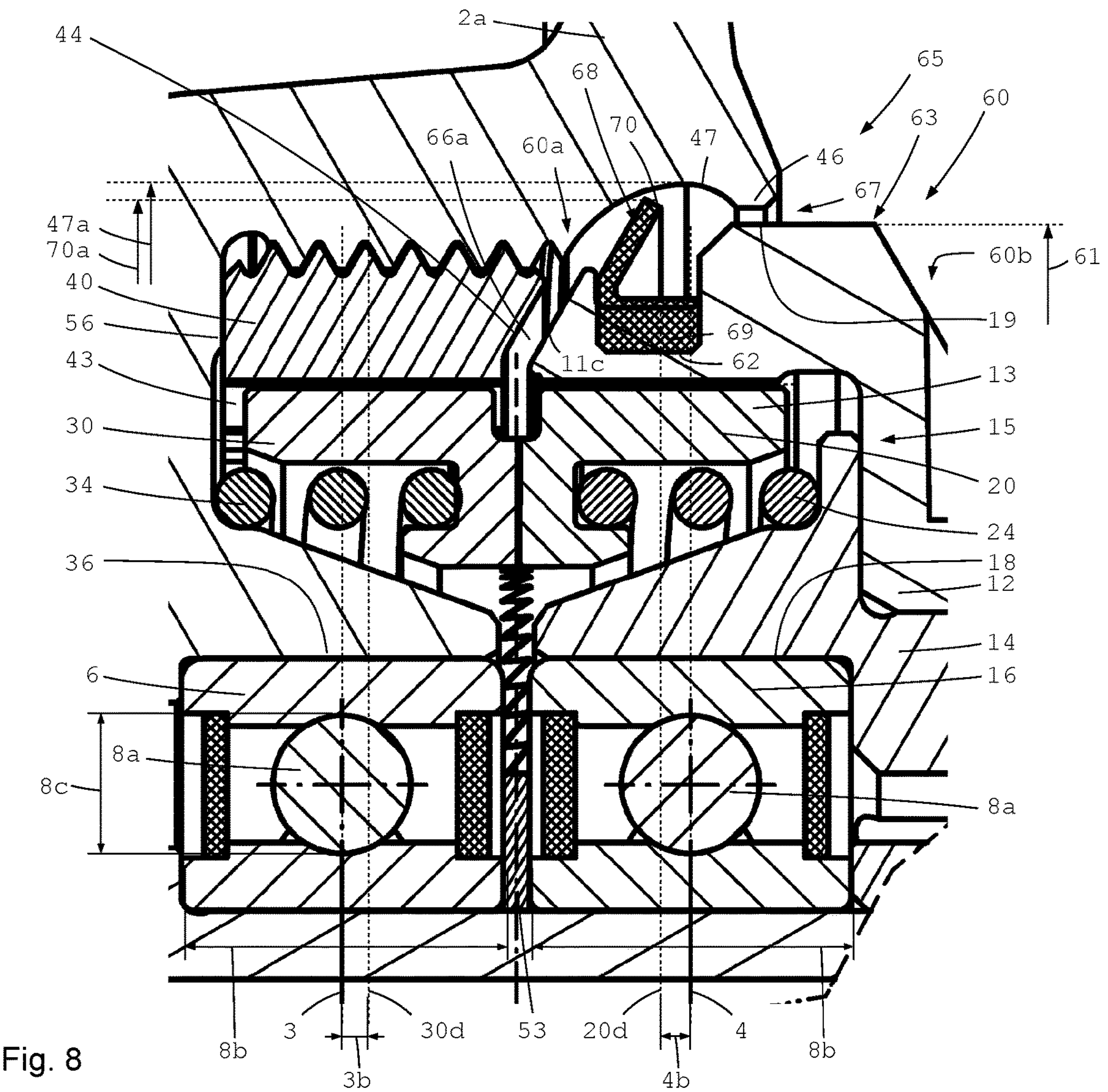
FIG. 8 an enlarged detail of a variant of a hub according to the application.

FIG. 8 shows an enlarged detail of a variant of FIG. 6, wherein, unlike the configuration according to FIG. 5, identically sized roller bearings 6, 16 (with identical widths 8*b*) are used as the hub-side rotor bearing 16 and the rotor-side hub bearing 6. This further facilitates installation and storage, since the quantity of different parts is further reduced. Again, the rotor-side toothed disk device 20 is accommodated in the accommodation 15 of the rotor body 11. The inner radial toothing 13 on the outer wall 19 guides the radial toothing 23 of the rotor-side toothed disk device 20 in the axial direction. The biasing device 24 urges the end toothing 22 in the direction toward the hub shell.

The outer diameter 70*a* of the elastic sealing lip 70 is larger than the outer diameter 61 of the outer sealing gap 67. This results in that water penetrating axially through the sealing gap 67 causes deformation of the sealing lip 70, so that it rests (more forcefully) against the wall of the sealing groove 47, obtaining a still higher sealing effect.

The central plane of cross section 20*d* (central plane of toothed disk) through the radial toothing 23 of the rotor-side toothed disk is only distant by a slight distance 4*b* from the plane of cross section 4 (plane of rolling member) through the rolling members 8*a* of the hub-side rotor bearing 16. The distance 4*b* between the planes of cross section 20*d* and 4 is, in particular, less than half the diameter respectively the radius of a rolling member 8, and particularly preferably it is also less than the smallest wall thickness of the hollow hub axle 5. This applies accordingly for the central plane of cross section 30*d* through the axial center of the radial toothing of the rotor-side toothed disk device 30. Again, the distance 3*b* between the two planes of cross section 3 (plane of rolling member) and 30*d* (central plane of toothed disk) is very small and, in particular, smaller than half the diameter or half the radius of a rolling member 8*a* of the rotor-side hub bearing 6.

The central plane of cross section 20*d* through the radial toothing 23 intersects the rolling members 8*a* of the hub-side rotor bearing 16. The central plane of cross section 30*d* through the radial toothing 33 also intersects the rolling members 8*a* of the rotor-side hub bearing 6. This effectively allows transferring the highest forces. The distances 3*b* and 4*b* are very small and smaller than half the diameter 8*c* or even half the radius of the rolling members 8*a*.

Figure 9:
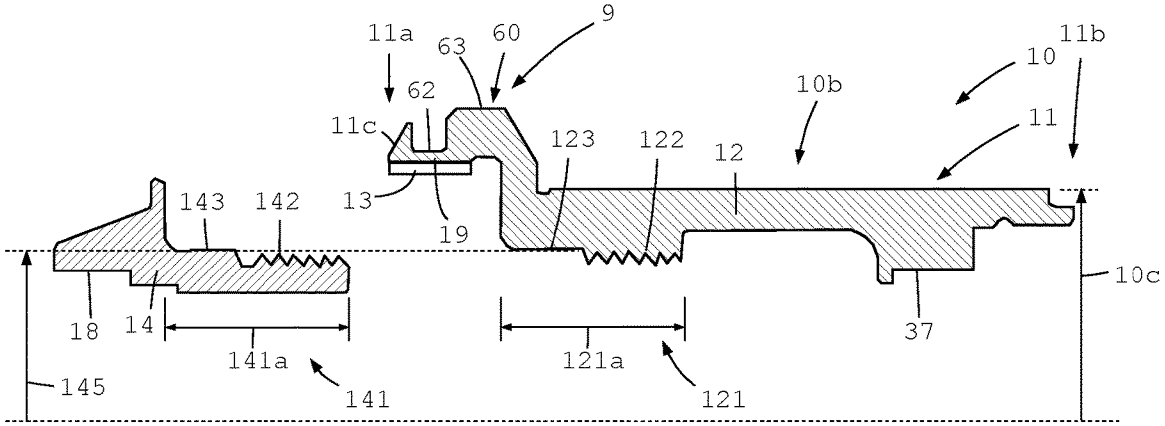
FIG. 9 a schematic, cross sectional view of a two-piece rotor for a hub according to the application.

FIG. 9 shows the two rotor parts schematically and axially adjacent, prior to assembly. The axial lengths 121*a* and 141*a* of the connecting area 121 (FIG. 10) and of the connecting portion 141 are the same, and the dimension of the rotor parts 12 and 14 are matched to one another.

A length 141*a* of the connecting portion 141 of the second rotor part 14, in particular, corresponds to at least ¼ or ⅓ of the length 14*a* of the second rotor part 14, in particular, between a quarter and half of the length of the rotor body 11.

The ratio of the length 143*a* of the guiding portion 143 to the diameter 145 of the guiding portion 143 is higher than 1:10. Preferably, the ratio of the length 143*a* of the guiding portion 143 to the length 141*a* of the connecting portion 141 is higher than 1:4.

Figure 10:
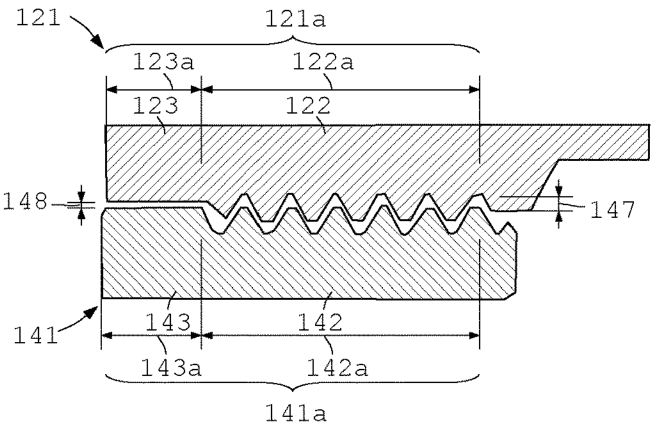
FIG. 10 a schematic detail of the two-piece rotor according to FIG. 9.

FIG. 10 shows the interaction of the connecting area 121 and the connecting portion 141 in an enlarged, schematic illustration. The connecting area 121 extends over a length 121*a*, which is composed of the length 122*a* of the threaded area 122 and the length 123*a* of the guiding area 123.

Accordingly, a connecting portion 141 is configured on the second rotor part 14, extending over a length 141*a*. The connecting portion 141 is composed of the threaded portion 142 and the guiding portion 143, which extend over a length 142*a* respectively 143*a*. The threaded area 122 (respectively the threaded portion 142) has a narrower tolerance 148 than does the screw-connected guiding area 123 (respectively guiding portion 143) having a tolerance 147. This provides high precision and repeatability of the radial orientation of the rotor 10.

Figure 11B:
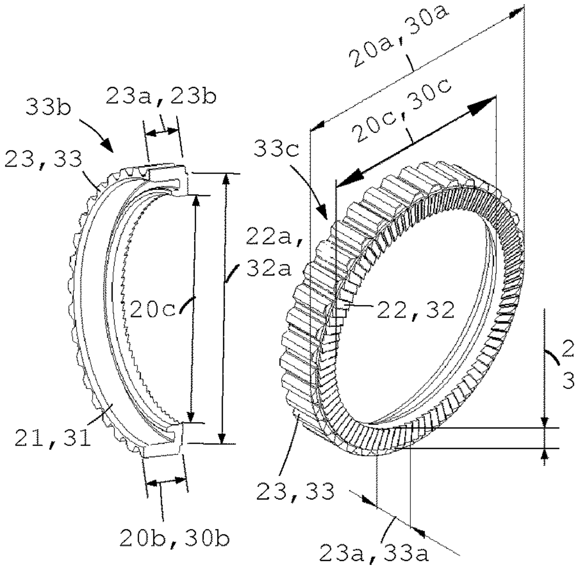

FIGS. 11*a* and 11*b* show the toothed disk devices 20, 30, presently identical, each having an engagement body 21, 31 and an end toothing 22, 32, and an outer radial toothing 23, 33. The outer radial toothings 23, 33 extend in the axial direction over an axial length 23*a*, 33*a*. The axial extension 21*a*, 31*a* of the engagement bodies 21, 31 is, at least by the axial width of the end toothings 22, 32, larger than the axial length 23*a*, 33*a* of the outer radial toothings 23, 33. The clear inner diameter 20*c* is larger than the outer diameter of the roller bearings 6, 16. The outer diameter 22*a*, 32*a* is larger than the outer diameter 10*c* of the sprocket accommodation 10*b*.

The number of teeth of the end toothing is preferably higher than 72, and it may be 90, 100, 110 or 120 or more.

The outer radial toothings 23, 33 of the toothed disk devices 20, 30 and the inner radial toothings 13, 43 preferably have between 20 and 60 radial teeth. In this exemplary embodiment, the toothed disk devices 20, 30 comprise approximately 36 radial teeth.

The radial extension 22*b*, 32*b* of the end toothings 22, 32 is less than the axial length 23*a*, 33*a* of the radial toothings 23, 33.

Figure 12C:
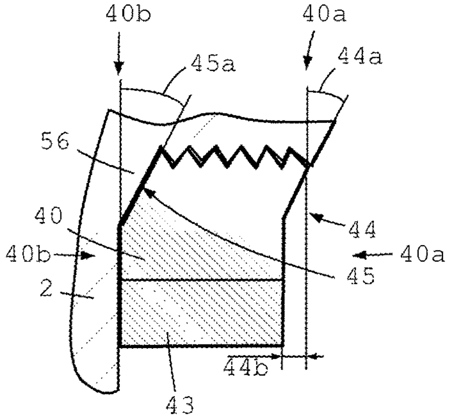

The FIGS. 12*a*, 12*b* and 12*c* show variants of the threaded ring 40, each comprising an axial width 42, and on the outer periphery, comprising a preferably multiple thread, with which to screw the threaded ring into a corresponding thread in the hub shell 2.

At the rotor-side end 40*a* of the threaded ring 40, a central depression 44, presently in the shape of a chamfer respectively conical depression 44, is configured running at an angle 44*a* of for example 30° and comprising a depth 44*b*.

The threaded ring 40, when properly mounted, is screwed into the hub shell 2. The hub-side toothed disk device 30 of the freewheel device 9 is accommodated therein. The end toothing 32 faces in the direction of the rotor 10 and is biased in the engagement position (E) by means of a biasing device 24.

The threaded ring 40 has an outer contour 41*d* with an external thread 41, and comprises a central through hole 40*c* with an inner contour 40*d*. The inner contour 40*d* comprises a non-round inner coupling contour 43*b*, which is non-rotatably coupled in the driving direction with a matching non-round outer coupling contour 33*b* on the outer periphery 33*c* of the hub-side toothed disk device 30. The inner coupling contour 43*b* may extend over the entire length or only part of the length of the inner contour 40*d*.

The threaded ring 40 has a central depression 44 at the rotor-side end 40*a*, so that the external thread 41 on the threaded ring 40 extends in the direction to the rotor 10 axially further outwardly than does the inner coupling contour 43*b*. This widens the external thread 41 of the threaded ring 40 in the direction toward the rotor 10. An improved accommodation of the threaded ring 40 in the hub shell 2 is possible. The strength is improved. The external thread 41 is extended.

Thus, the axial length 41*c* of the external thread 41 is larger than the axial length 33*a* of the coupling structure, which comprises the inner coupling contour 43*b* and the outer coupling contour 33*b*. The threaded ring 40 is screwed into the internal thread 48 of the hub shell 2 by means of the external thread 41.

The hub-side toothed disk device 30 is accommodated radially within the threaded ring 40 by way of the coupling structure 33*b*, 43*b*, non-rotatably in the driving direction and axially movable. At the rotor-side end 40*a*, the threaded ring 40 has a central, and presently centered, depression 44. The axial width 41*c* of the external thread 41 is wider than the axial width 33*a* of the coupling structure.

In the variant according to FIG. 12*b*, the central depression 44 is configured as a conical depression. In all the exemplary embodiments, the depression 44 has an axial depth 44*b* of at least 5% (and, in particular, at least 10%) of the axial width 42 of the threaded ring 40. The axial length 41*c* of the outer contour 41*d* of the threaded ring 40 is larger than the axial length 43*a* of the inner radial toothing 43 (which is the inner coupling contour 43*b*).

The axial depth 44*b* of the central depression 44 is between 5% and 25% of the axial width 42 of the threaded ring 40, and preferably between 10% and 20% of the axial width 42 of the threaded ring 40. The axial depth 44*b* of the central depression 44 is preferably between 0.5 mm and 3 mm.

In all the configurations, the central depression 44 may be stepped and for example configured as a stepped depression 44*d*, as is for example indicated in broken lines in FIG. 12*b*. Also possible is, a stepped and conical configuration. Preferably, the central depression 44 is configured conical or convex as a centric chamfer. An angle or cone angle 44*a* of the (conical) depression 44 to a plane transverse to the axis of symmetry of the hub or hub axle, is, in particular, between 5° and 30°.

In the exemplary embodiment, the inner coupling contour 43*b* comprises, or is configured as, an inner radial toothing 43 on the threaded ring 40. The outer coupling contour 33*b* on the hub-side toothed disk device 30 comprises, or is configured as, an outer radial toothing 33. In the mounted condition, a conical portion 11*c* configured on the end face 10*a* of the rotor 10, plunges contactless into the central depression 44 on the threaded ring 40. A sealing gap is configured in-between.

At the other end 40*b*, a conical support portion 45 may be configured (see FIG. 12*c*), extending at the conical angle 45*a* (for example) 30°. Such a conical support portion 45 allows saving axial mounting space. Alternately it is possible to configure the support portion 45 perpendicular to the axis of symmetry. This facilitates manufacture.

Overall, an advantageous hub 1 and an advantageous rotor 10 are provided, which are simple in structure. The hub 1 is easy to assemble and comprises a relatively small number of parts. High stability is achieved. A high number of teeth of the end toothing can provide a very narrow engagement angle.

The configuration of the rotor-side toothed disk device 20 in the accommodation 15 in the rotor provides a compact hub 1, in which the rotor-side toothed disk device 20 is guided in the inner radial toothing 13 of the rotor. This provides a high quality, axial guiding. The large diameter of the radial toothing and thus of the axial guide prevents tilting and jamming and provides for a reliable function.

While a particular embodiment of the present hub and rotor, in particular for bicycles have been described herein, it will be appreciated by those skilled in the art that changes and modifications may be made thereto without departing from the invention in its broader aspects and as set forth in the following claims.

List of reference numerals:

| | | | |
|---|---|---|---|
| 1 | hub | 148 | tolerance of 143/123 |
| 2 | hub shell | 15 | accommodation |
| 2a | hub flange | 16 | hub-side rotor bearing |
| 2b | hub flange | 16a | axial width |
| 3 | plane of cross section, plane of rolling member | 16b | external diameter |
| 3a | distance of 3, 4 | 17 | outer rotor bearing |
| 3b | distance 3, 30d | 18 | inner radial wall |
| 4 | plane of cross section, plane of rolling member | 19 | outer wall |
| 4b | distance 4, 20d | 20 | rotor-side toothed disk device |
| 5 | hub axle | 20a | external diameter |
| 5a | through hole | 20b | axial width |
| 6 | rotor-side hub bearing | 20c | clear inner diameter |
| 6a | axial width | 20d | central plane of cross section |
| 6b | external diameter | 21 | engagement body |
| 7 | outer hub bearing | 21a | axial extension |
| 8 | roller bearing | 22 | end toothing |
| 8a | rolling member | 22a | external diameter |
| 8b | axial width | 22b | radial height |
| 8c | diameter 8a | 23 | radial toothing |
| 9 | freewheel device | 23a | axial length |
| 10 | rotor | 24 | biasing device |
| 10a | hub-side end face | 25 | fitted length |
| 10b | sprocket accommodation | 26, 27 | bearing distance |
| 10c | outer diameter 10b | 28 | distance |
| 11 | rotor body | 29 | distance |
| 11a | hub-side end | 30 | hub-side toothed disk device |
| 11b | outer end | 30a | external diameter |
| 11c | conical portion | 30b | axial width |
| 12 | first rotor part | 30c | clear inner diameter |
| 121 | connecting area | 30d | central plane of cross section |
| 121a | length of 121 | 31 | engagement body |
| 122 | threaded area | 31a | axial extension |
| 122a | length of 122 | 32 | end toothing |
| 123 | guiding area | 32b | radial height |
| 123a | length of 123 | 33 | radial toothing |
| 13 | inner radial toothing | | |
| 14 | second rotor part | | |

-continued

List of reference numerals:

| | | | |
|---|---|---|---|
| 141 | connecting portion | 33a | axial length |
| 141a | length of 141 | 33b | outer coupling contour |
| 142 | threaded portion | 33c | outer periphery |
| 142a | length of 142 | 34 | biasing device |
| 143 | guiding portion | 35 | accommodation |
| 143a | length of 143 | 36 | inner wall |
| 210a | diameter of 143 | 37 | wall |
| 147 | tolerance of 142/122 accommodation | 38 | brake disk |
| 40 | threaded ring | 58 | clamping mechanism |
| 40a | rotor-side end, axially outer surface | 59 | clamping axle |
| 40b | hub-side end, axially inner surface | 59a | end piece |
| 40c | central through hole | 59b | diameter |
| 40d | inner contour of 40 | 60 | end portion |
| 41 | external thread | 60a | hub-side end (60) |
| 41a, b | thread groove | 60b | other end of 60 |
| 41c | axial length | 61 | diameter |
| 41d | outer contour | 62 | groove |
| 42 | axial width | 63 | enlarged diameter area |
| 43 | inner radial toothing | 65 | sealing device |
| 43a | axial length | 66 | inner sealing gap |
| 43b | inner coupling contour | 66a | cone gap |
| 44 | central depression, conical depression | 66b | clear gap width |
| 44a | angle | 67 | outer sealing gap |
| 44b | depth | 67a | clear dimension |
| 44c | height | 68 | sealing unit |
| 44d | stepped depression | 69 | ring portion |
| 45 | (conical) support portion | 70 | sealing lip/elastic wall |
| 45a | angle | 70a | external diameter |
| 46 | sealing wall | 100 | bicycle |
| 47 | sealing groove | 101 | wheel, front wheel |
| 47a | diameter | 102 | wheel, rear wheel |
| 48 | thread in 2 | 103 | frame |
| 49a, b | thread groove | 104 | fork, suspension fork |
| 50, 51 | limit stop | 105 | rear wheel damper |
| 52 | sleeve body | 106 | handlebar |
| 53 | spacer | 107 | saddle |
| 54, 55 | radial bulges | 109 | spoke |
| 54a | shoulder | 110 | rim |
| 55a | shoulder | 111 | sprocket assembly |
| 56 | accommodating contour (conical) | 112 | pedal crank |
| | | F | freewheeling position |
| | | E | engagement position |

The invention claimed is:

1. A hub for at least partially muscle-powered vehicles, comprising: a hub axle; a hub shell; a rotor; and a freewheel device;

wherein the hub shell is supported for rotation with two axially spaced apart hub bearings on the hub axle, a rotor-side hub bearing and an opposite, outer hub bearing;

and wherein the rotor comprises a rotor body and is supported on the hub axle for rotation with two axially spaced apart rotor bearings, a hub-side rotor bearing and an opposite, outer rotor bearing, and wherein the freewheel device comprises a hub-side toothed disk device and a rotor-side toothed disk device interacting therewith, each comprising an end toothing for engagement with one another, and biased to an engagement position by means of a biasing device;

the rotor body comprises at least two rotor parts, a first rotor part and a second rotor part connected with the first rotor part in a rotationally fixed manner in the driving direction, and one of the rotor parts accommodates one of the rotor bearings and the other of the rotor parts, accommodates the other rotor bearing, and the rotor-side toothed disk device is accommodated on the rotor body; and the rotor-side toothed disk device is radially accommodated between the first rotor part and the second rotor part, and is coupled with the first rotor part in a rotationally fixed manner.

2. The hub according to claim 1, wherein the outer rotor bearing is accommodated on the first rotor part, and the hub-side rotor bearing is accommodated on the second rotor part.

3. The hub according to claim 1, wherein the rotor-side toothed disk device is accommodated axially movable, and is biased in the engagement position by way of the biasing device assigned to the rotor-side toothed disk device.

4. The hub according to claim 1, wherein the hub-side toothed disk device is accommodated axially movable on the hub shell and is biased in the engagement position by way of the biasing device assigned to the hub-side toothed disk device.

5. The hub according to claim 1, wherein the hub-side toothed disk device and the rotor-side toothed disk device each comprise an outer radial toothing and engage in inner radial toothings in the hub shell and in the rotor, and are accommodated in a rotationally fixed manner in the driving direction.

6. The hub according to claim 1, wherein the second rotor part is screw-connected with the first rotor part.

7. The hub according to claim 1, wherein the second rotor part is accommodated in the first rotor part.

8. The hub according to claim 1, wherein an inner radial wall is configured on the second rotor part at a hub-side end to radially support the hub-side rotor bearing, and wherein radially between the inner radial wall and an outer wall of the rotor, a circumferential accommodation accessible from an end face is configured on the end face at the hub-side end of the rotor, in which the rotor-side toothed disk device is accommodated to be non-rotatable in the driving direction and axially movable.

9. The hub according to claim 1, wherein a connecting area of the first rotor part is connected with a connecting portion of the second rotor part, and wherein the connecting portion comprises a threaded portion and a guiding portion, and wherein the connecting area comprises a threaded area and a guiding area;

and wherein the threaded area is screw-connected to the threaded portion, and wherein the guiding area is centered on the guiding portion, and wherein a radial tolerance between the first rotor part and the second rotor part on the threaded portion is larger than it is on the guiding portion;

and wherein a length of the connecting portion of the second rotor part corresponds to at least ¼ of a length of the second rotor part.

10. The hub according to claim 9, wherein a ratio of a length of the guiding portion to a diameter of the guiding portion is higher than 1:10.

11. The hub according to claim 10, wherein a ratio of the length of the guiding portion to the length of the connecting portion is higher than 1:4.

12. A rotor for a hub for at least partially muscle-powered vehicles, comprising a rotor body, which extends from an inner, hub-side end toward an outer end;

wherein the rotor body is supported on a hub axle for rotation with two axially spaced apart rotor bearings, a hub-side rotor bearing and an opposite, outer rotor bearing;

and comprising a rotor-side toothed disk device coupled with the rotor body, to couple the rotor body with a hub shell in a rotationally fixed manner in the driving direction, and to decouple from the hub shell in a freewheeling position;

wherein the rotor-side toothed disk device comprises an end toothing for engagement with an end toothing coupled to a hub shell, and wherein the rotor-side toothed disk device is biased to an engagement position by means of at least one biasing device;

the rotor body comprises at least two rotor parts, a first rotor part and second rotor part connected with the first rotor part in a rotationally fixed manner in the driving direction;

and one of the rotor bearings is accommodated on one of the rotor parts and the other of the rotor bearings is accommodated on the other of the rotor parts; and wherein radially between the first rotor part and the second rotor part, the rotor-side toothed disk device is accommodated and is coupled with the first rotor part in a rotationally fixed manner;

and wherein the rotor-side toothed disk device is accommodated axially movable and is biased in the engagement position by way of the biasing device.

13. The rotor according to claim 12, wherein the outer rotor bearing is accommodated on the first rotor part, and the hub-side rotor bearing is accommodated on the second rotor part.

14. The rotor according to claim 12, wherein the rotor-side toothed disk device comprises an outer radial toothing and engages in an inner radial toothing in the rotor, and is accommodated in a rotationally fixed manner in the driving direction.

15. The rotor according to claim 12, wherein the second rotor part is accommodated in the first rotor part, and wherein the second rotor part is screw-connected with the first rotor part.

16. The rotor according to claim 12, wherein an inner radial wall is configured on the second rotor part at the hub-side end to radially support the hub-side rotor bearing;

and wherein radially between the inner radial wall and an outer wall of the rotor, a circumferential accommodation accessible from an end face is configured on the end face at the hub-side end of the rotor, in which the rotor-side toothed disk device is accommodated to be non-rotatable in the driving direction and axially movable.

17. The rotor according to claim 12, wherein a connecting area of the first rotor part is connected with a connecting portion of the second rotor part, and wherein the connecting portion comprises a threaded portion and a guiding portion, and wherein the connecting area comprises a threaded area and a guiding area;

and wherein the threaded area is screw-connected to the threaded portion, and wherein the guiding area is centered on the guiding portion, and wherein a radial tolerance between the first rotor part and the second rotor part on the threaded portion is larger than it is on the guiding portion;

and wherein a length of the connecting portion of the second rotor part corresponds to at least ¼ of a length of the second rotor part, and wherein a ratio of a length of the guiding portion to a diameter of the guiding portion is higher than 1:10;

and/or wherein a ratio of the length of the guiding portion to the length of the connecting portion is higher than 1:4.

18. A hub for at least partially muscle-powered vehicles, comprising: a hub axle; a hub shell; a rotor; and a freewheel device;

wherein the hub shell is supported for rotation with two axially spaced apart hub bearings on the hub axle, a rotor-side hub bearing and an opposite, outer hub bearing;

and wherein the rotor comprises a rotor body and is supported on the hub axle for rotation with two axially spaced apart rotor bearings, a hub-side rotor bearing and an opposite, outer rotor bearing, and wherein the freewheel device comprises a hub-side toothed disk device and a rotor-side toothed disk device interacting therewith, each comprising an end toothing for engagement with one another, and biased to an engagement position by means of a biasing device;

the rotor body comprises at least two rotor parts, a first rotor part and a second rotor part connected with the first rotor part in a rotationally fixed manner in the driving direction, and that one of the rotor parts accommodates one of the rotor bearings and the other of the rotor parts, accommodates the other rotor bearing, and that the rotor-side toothed disk device is accommodated on the rotor body;

wherein a connecting area of the first rotor part is connected with a connecting portion of the second rotor part, and wherein the connecting portion comprises a threaded portion and a guiding portion, and wherein the connecting area comprises a threaded area and a guiding area;

and wherein the threaded area is screw-connected to the threaded portion, and wherein the guiding area is centered on the guiding portion, and wherein a radial tolerance between the first rotor part and the second rotor part on the threaded portion is larger than it is on the guiding portion;

and wherein a length of the connecting portion of the second rotor part corresponds to at least ¼ of a length of the second rotor part.

* * * * *